US006877104B1

(12) United States Patent
Shimono

(10) Patent No.: US 6,877,104 B1
(45) Date of Patent: Apr. 5, 2005

(54) WIRELESS LOCAL AREA NETWORK SYSTEM, FAULT RECOVERY METHOD, AND RECORDING MEDIUM STORED THEREIN A COMPUTER PROGRAM EXECUTING THE FAULT RECOVERY PROCESS

(75) Inventor: Fumihisa Shimono, Tokyo (JP)

(73) Assignee: NEC Infiontia Corporation, Kawasaki (JP)

( * ) Notice: Subject to any disclaimer, the term of this patent is extended or adjusted under 35 U.S.C. 154(b) by 0 days.

(21) Appl. No.: 09/535,893

(22) Filed: Mar. 27, 2000

(30) Foreign Application Priority Data

Mar. 29, 1999 (JP) .......................................... 11/086183
Mar. 16, 2000 (JP) ....................................... 2000-074516

(51) Int. Cl.[7] .............................................. G06F 11/00
(52) U.S. Cl. ........................... 714/4; 370/216; 370/217; 370/338
(58) Field of Search ................................. 714/4, 11, 16, 714/43, 48; 370/216–228, 338, 401; 455/432; 709/224, 219; 707/10

(56) References Cited

U.S. PATENT DOCUMENTS

| | | | | |
|---|---|---|---|---|
| 5,655,219 A | * | 8/1997 | Jusa et al. ................... | 455/338 |
| 6,122,759 A | * | 9/2000 | Ayanoglu et al. ............. | 714/57 |
| 6,212,175 B1 | * | 4/2001 | Harsch ....................... | 370/338 |
| 6,339,585 B1 | * | 1/2002 | Hulyalkar et al. ........... | 370/226 |
| 6,366,584 B1 | * | 4/2002 | Gulliford et al. ............ | 370/403 |
| 6,549,786 B2 | * | 4/2003 | Cheung et al. .............. | 455/524 |
| 6,556,553 B1 | * | 4/2003 | Palmer et al. ............... | 370/333 |
| 6,574,266 B1 | * | 6/2003 | Haartsen ..................... | 375/133 |

FOREIGN PATENT DOCUMENTS

| | | |
|---|---|---|
| JP | 7312597 | 11/1995 |
| JP | 8-242232 | 9/1996 |
| JP | 9-215044 | 8/1997 |

* cited by examiner

Primary Examiner—Robert Beausoliel
Assistant Examiner—Michael Maskulinski
(74) Attorney, Agent, or Firm—Dickstein, Shapiro, Morin & Oshinsky, LLP.

(57) ABSTRACT

The present invention provides a wireless local area network (LAN) system preventing throughput from being decreased even when a fault occurs in an access point, a fault recovery method, and a recording medium stored therein a computer program for executing the fault recovering process. The method for use in a wireless local area network system comprising a plurality of access points and a plurality of client terminals, the method comprising the steps of: detecting, by each of the access points, whether a fault occurs on each of the access points itself; disconnecting, by the access point which has detected the fault, the client terminal connected thereto; searching for, by the disconnected client terminal, another of the client terminals to which the disconnected client terminal is to be connected; and connecting the disconnected client terminal to the searched client terminal.

9 Claims, 14 Drawing Sheets

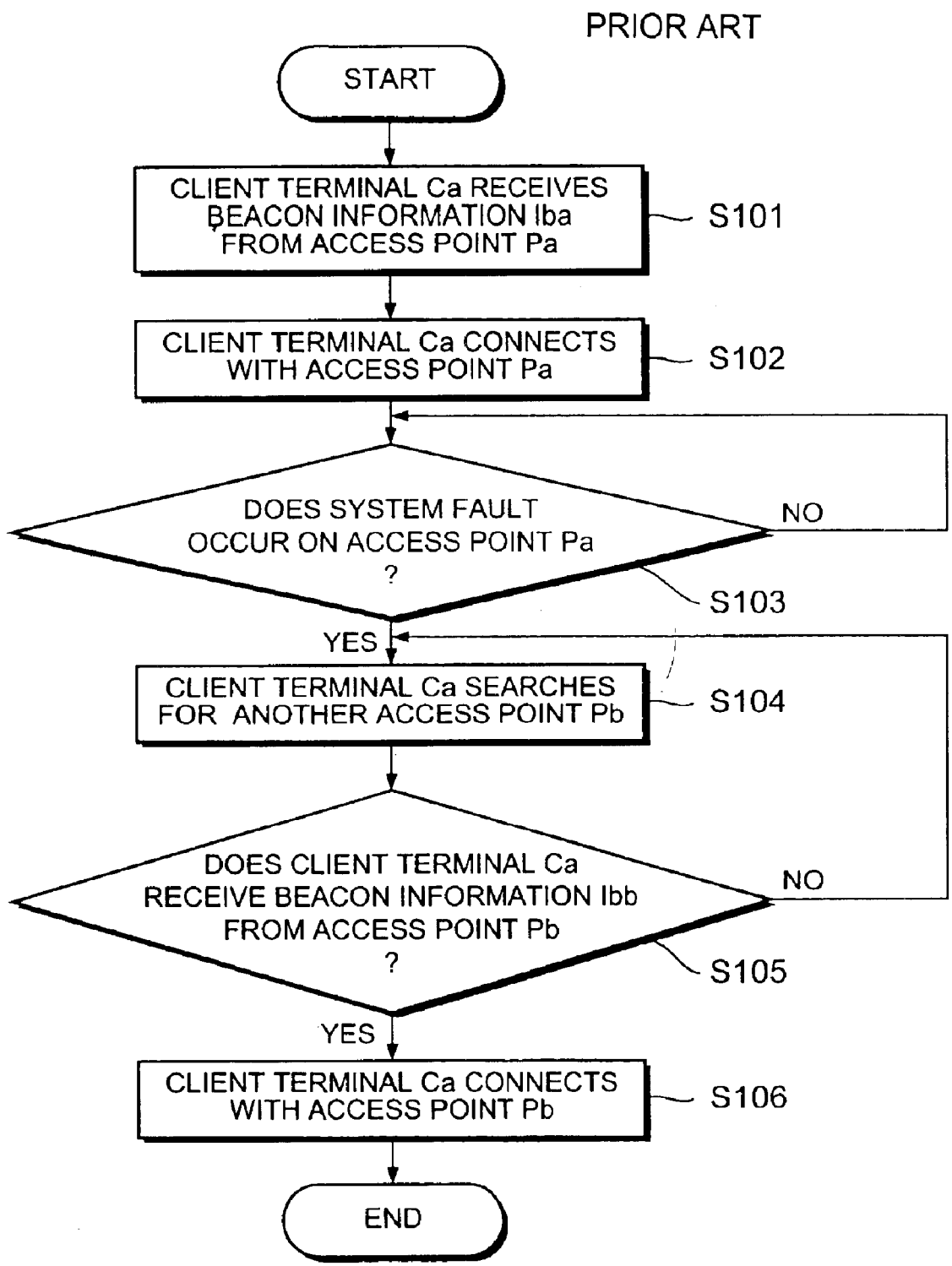

WIRELESS LOCAL AREA NETWORK SYSTEM, FAULT RECOVERY METHOD, AND RECORDING MEDIUM STORED THEREIN A COMPUTER PROGRAM EXECUTING THE FAULT RECOVERY PROCESS

BACKGROUND OF THE INVENTION

1. Field of the Invention

The present invention relates to a wireless local area network (LAN) system, a fault recovery method, and a recording medium stored therein a computer program for executing the fault recovering process. More particularly, the present invention relates to a technology for preventing the throughput of the whole LAN system from being decreased even when a fault occurs in an access point.

2. Description of the Prior Art

Conventionally, there has been a wireless local area network (LAN) system connected to a wired LAN and many wireless terminals.

Japanese Patent Laid-Open Publication No. Hei 7-312597 (disclosed in Japan on Nov. 28, 1995) discloses a wireless LAN system that prevents packets from being lost. This technology will be described below as a first conventional example.

FIG. 10 is a block diagram showing the wireless LAN system according to the first conventional example. A wireless LAN system 110, shown in FIG. 10, consists of a client terminal 118 connected to a wired LAN 112, a LAN cable 120 forming the wired LAN 112, access points 122 and 124 performing as bridges to the wired LAN 112, and wireless terminals 130 and 134 which, in conjunction with the access points 122 and 124, form wireless LANs 114 and 116, respectively.

In the system of this conventional example, when the source wireless terminal 130 transmits a packet to the destination wireless terminal 134 but the wireless terminal 134 does not respond to it, the access point 122 or 124 transmits the packet to the wireless LAN 114 or 116 or transmits the packet to the wired LAN 112. In this way, the system prevents a packet loss caused by a conflict in accessing the medium or an interference with other communication networks using the same frequency band.

Japanese Patent Laid-Open Publication No. Hei 8-242232 (disclosed in Japan on Sep. 17, 1996) discloses a wireless terminal LAN having a repeater. This technology will be described as a second conventional example.

FIG. 11 is a block diagram of the wireless LAN system of the second conventional example. The wireless terminal LAN, shown in FIG. 11, consists of wireless terminals 202–210 and a wireless repeater 201 containing a transceiver 220.

The system according to this conventional example has the special wireless repeater 201 and, through this wireless repeater 201, re-transmits packets to reduce conflicts in radio waves. Thus, the system can prevent the throughput of the whole LAN from being decreased.

Japanese Patent Laid-Open Publication No. Hei 9-215044 (disclosed in Japan on Aug. 15, 1997) discloses a priority switching technology for a cellular wireless LAN. This technology will be described as a third conventional example.

FIG. 12 is a block diagram of the wireless LAN system according to the third conventional example. The wireless LAN system, shown in FIG. 12, consists of a plurality of portable units 302 that are wireless terminals, a house computer 304 connected to a wired LAN, and a plurality of access points 305 that perform as bridges to the wired LAN.

In the system according to this conventional example, the portable unit 302 searches and identifies the access point 305 best suited for communication, based on the intensity of radio waves from, and the loading factor of, the plurality of the access points 305.

In addition, to make the advantages of the present invention clearer, a virtual technology with a configuration equivalent to that of the system according to the present invention will be described as a fourth conventional example.

FIG. 13 is a block diagram of a wireless LAN system according to the fourth conventional example. FIG. 14 is a flowchart showing a fault recovery processing of the wireless LAN system according to the fourth conventional example.

The wireless LAN system, shown in FIG. 13, consists of access points Pa and Pb that perform as bridges to a wired LAN system Lw, client terminals Ca–Cd that are wireless terminals communicating with the access points Pa and Pb, and a LAN cable 405 consisting the wired LAN system Lw.

As shown in FIG. 13, the access points Pa and Pb transmit beacon information Iba and Ibb, respectively, at regular intervals (step S101 in FIG. 14).

When the client terminal Ca receives the beacon information Iba from the access point Pa at power-on time or roaming time, the client terminal Ca transmits a management frame back to the access point Pa to start negotiation with the access point Pa and then starts communication with the access point Pa.

The client terminal Cb also starts negotiation with the access point Pb and then starts communication with the access point Pb according to the same procedure (step S102 in FIG. 14).

At this point, when the access point Pa fails for some reason or other (step S103 in FIG. 14), the client terminal Ca cannot continue communication with the access point Pa. So, the client terminal Ca starts searching for another access point Pb (step S104 in FIG. 14).

If another access point Pb is near the client terminal Ca (step S105 in FIG. 14), there is no problem because the client terminal Ca can immediately establish a link with the access point Pb to continue communication (step S106 in FIG. 14).

However, if another access point Pb is not near the client terminal Ca (step S105 in FIG. 14), the client terminal Ca continues search processing until it successfully searches for the access point Pb (step S104 in FIG. 14).

This search processing is executed by the client terminal Ca for transmitting a management frame (probe) that is communication control management information. To establish the link to the access point Pb as soon as possible and to continue communication reliably, the client terminal Ca continues transmitting the management frame, during this search processing, at an interval shorter than that for a normal communication frame.

However, the above processing has the problems described below.

First, in the above search processing, the client terminal Ca frequently transmits the management frame at an interval shorter than that for the normal communication frame. This increases the radio wave interference around the client terminal Ca and therefore decreases the throughput of the whole LAN system L.

Second, in the above search processing, the client terminal Ca frequently transmits the management frame at an interval shorter than that for the normal communication frame. This processing has some problems with the client terminal Ca being battery-powered. For example, this processing consumes more battery power for communication and therefore shortens battery life. And, the increase in power consumption causes a quickly decrease in the power voltage, sometimes suddenly disconnecting the power of the portable information terminal and thus destroying data due to a communication interruption.

Third, in a wireless LAN system Ll, the duplicated system configuration is built usually for the access points Pa and Pb as a fail-safe against the shutdown of the whole LAN system L. This shutdown may be caused by such conditions as a fault in access point Pa or Pb or the disconnection of a LAN cable 405. However, in a wireless LAN system used generally in Japan, whose frequency bandwidth is only one third of a wireless LAN system generally used in the United States, duplicating the access points Pa and Pb allows the access points Pa and Pb to transmit radio waves frequently during the above search processing. This increases the radio wave interference and therefore decreases the throughput of the whole LAN system.

SUMMARY OF THE INVENTION

An object of the present invention is to provide a wireless LAN system that prevents throughput from being decreased even when an access point fails, a fault recovery method, and a recording medium storing therein a computer program executing the fault recovery process.

The wireless LAN (Local Area Network) system according to the present invention consisting of a plurality of access points and a plurality of client terminals; wherein each of the plurality of access points consists of: a main unit for communicating with the client terminals, a first fault detecting unit for detecting a fault on the main unit, and a disconnection controlling unit for disconnecting the client terminal connected to the access point where the fault was detected by the first fault detecting unit; and wherein each of the plurality of client terminals consists of: a transceiver unit for communicating with the access point, a search controlling unit for searching for another client terminal to which the client terminal disconnected from the access point is to be connected, and a connection controlling unit for connecting the disconnected client terminal to the searched client terminal by the search controlling unit.

The fault recovery method according to the present invention consisting of a plurality of access points and a plurality of client terminals, the method consisting of the steps of: detecting, by each of the access points, whether a fault occurs on each of the access points itself; disconnecting, by the access point which has detected the fault, the client terminal connected thereto; searching for, by the disconnected client terminal, another of the client terminals to which the disconnected client terminal is to be connected; and connecting the disconnected client terminal to the searched client terminal.

The recording medium stores therein a computer program for executing a fault recovery process according to the present invention consisting of a plurality of access points and a plurality of client terminals, the process consisting of the steps of: detecting, by each of the access points, whether a fault occurs on each of the access points itself; disconnecting, by the access point which has detected the fault, the client terminal connected thereto; searching for, by the disconnected client terminal, another of the client terminals to which the disconnected client terminal is to be connected; and connecting the disconnected client terminal to the searched client terminal.

When a fault occurs in an access point, a client terminal connected to this access point is disconnected. Instead of connecting the disconnected client terminal to another access point as in the conventional example, the system according to the present invention connects the client terminal to another client terminal. And, through this another client terminal, the disconnected client terminal connects to another access point. This prevents the load from being concentrated at another access point.

BRIEF DESCRIPTION OF THE DRAWINGS

FIG. 14 is a flowchart showing a fault recovery processing of the wireless LAN system according to the fourth conventional example.

DETAILED DESCRIPTION OF THE PREFERRED EMBODIMENTS

Figure 1:
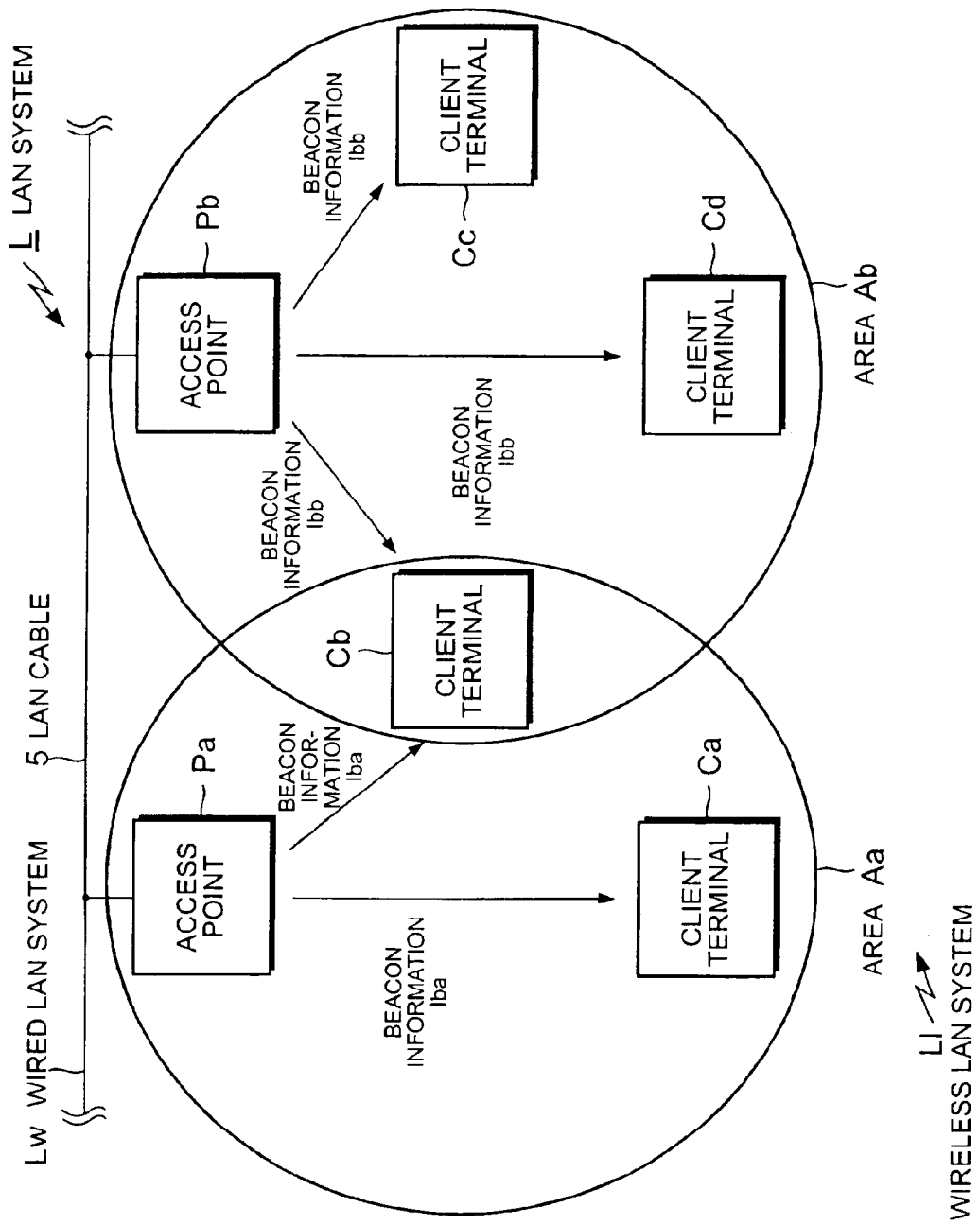
FIG. 1 is a block diagram showing a wireless LAN system in an embodiment of the present invention.

FIG. 1 is a block diagram showing a wireless LAN system in an embodiment of the present invention.

A wireless LAN system Ll, shown in FIG. 1, consists of access points Pa and Pb that are bridges to a wired LAN system Lw and client terminals Ca–Cd that are wireless communication terminals communicating with these access points Pa and Pb.

This wireless LAN system Ll uses Carrier Sense Multiple Access with Collision Avoidance (CSMA/CA) as the communication protocol. Note that any number of the access points Pa and Pb and the client terminals Ca–Cd may be used.

On the other hand, the wired LAN system Lw consists of the access points Pa and Pb, which are bridges to the wireless LAN system Ll, and a LAN cable 5 which is, for example, an Ethernet cable connecting the access points Pa and Pb. This wired LAN system Lw uses Carrier Sense Multiple Access with Collision Detection (CSMA/CD) as the communication protocol.

Figure 2:
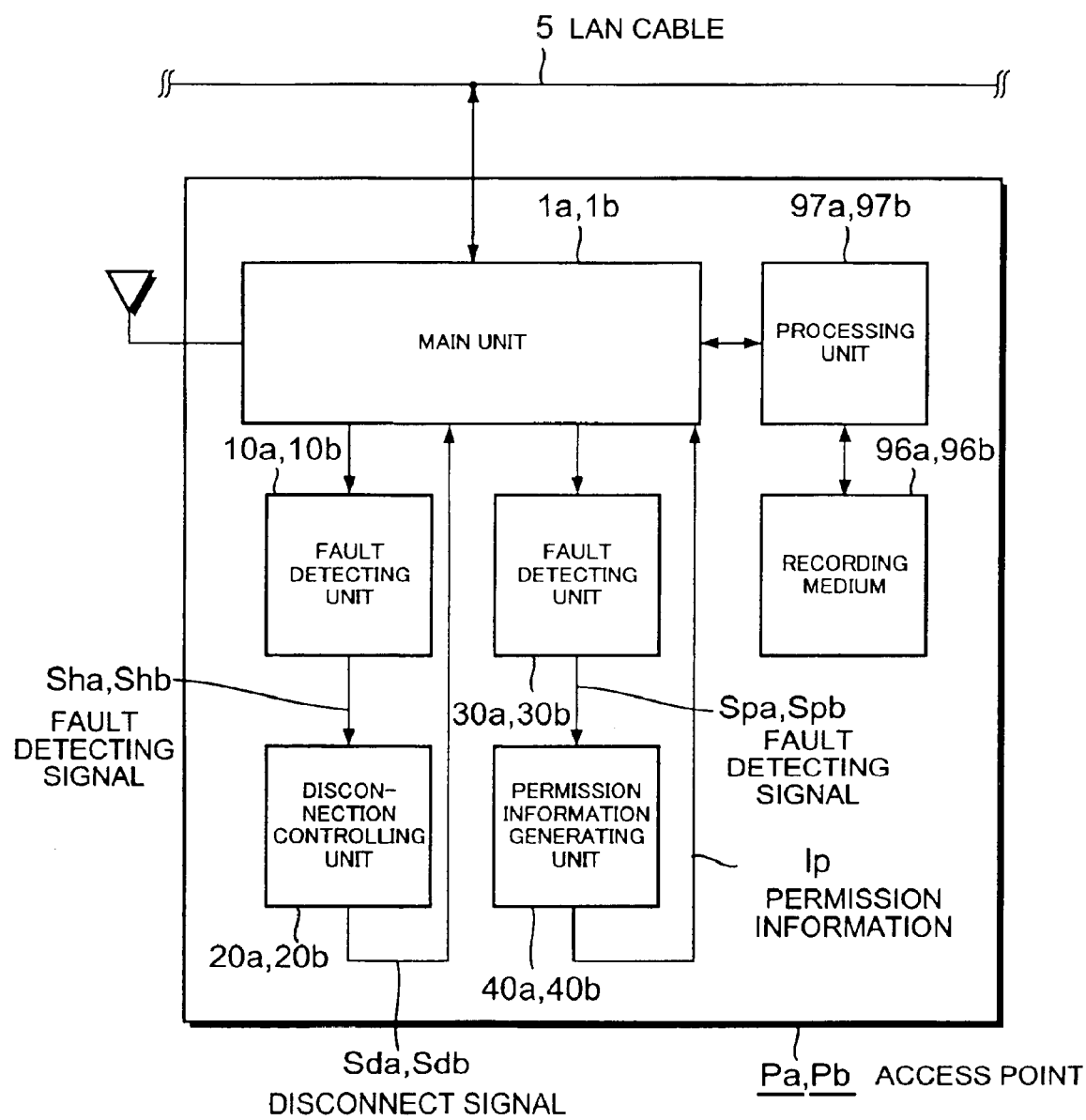
FIG. 2 is a block diagram of an access point of the wireless LAN system according to the FIG. 1 embodiment.

FIG. 2 is a block diagram of an access point of the wireless LAN system according to the FIG. 1 embodiment. The access point Pa, shown in FIG. 2, consists of a main unit 1a, a fault detecting unit 10a, a disconnection controlling unit 20a, a fault detecting unit 30a, and a permission information generating unit 40a.

The main unit 1a is a relaying unit connecting the wired LAN system Lw (FIG. 1) and the wireless LAN system Ll (FIG. 1). The main unit 1a communicates with the client terminals Ca and Cb (FIG. 1) included in an area Aa (FIG. 1) served by the access point Pa by radio waves. Not only the radio waves but also other wireless communication media such as an infrared ray may be used as the communication medium.

In addition, the main unit 1a transmits management information, called beacon information Iba (FIG. 1), at regular intervals. The beacon information is composed of synchronization information, packet transmission control information, and so on. By exchanging the beacon information Iba and Ibb (FIG. 1) with the other access point Pb, the main unit 1a maintains the synchronization of the whole LAN system and, at the same time, controls communication so that a packet collision is avoided.

The fault detecting unit 10a is means for monitoring the status of communication between the wired LAN system Lw and the main unit 1a. When the main unit 1a of the access point Pa fails or the LAN cable 5 is disconnected, the fault detecting unit 10a detects that the main unit 1a has been disconnected from the LAN cable 5 and outputs a fault detecting signal Sha.

In response to the fault detecting signal Sha, the disconnection controlling unit 20a outputs a disconnect signal Sda to the main unit 1a to instruct the main unit 1a to disconnect the client terminal Ca (FIG. 1) being connected.

The fault detecting unit 30a receives the beacon information Ibb (FIG. 1) from the other access point Pb (FIG. 1). If the fault detecting unit 30a detects that the other access point Pb (FIG. 1) has failed, the fault detecting unit 30a outputs a fault detecting signal Spa.

In response to the fault detecting signal Spa, the permission information generating unit 40a transmits permission information Ip which permits all the client terminals under control of the access point Pa, that is, Ca and Cb (FIG. 1), to accept the urgent identification (ID) code.

A main unit 1b, a fault detecting unit 10b, a disconnection controlling unit 20b, a fault detecting unit 30b, and a permission information generating unit 40b of the access point Pb each have the configuration similar to that of the corresponding unit of the access point Pa.

Figure 3:
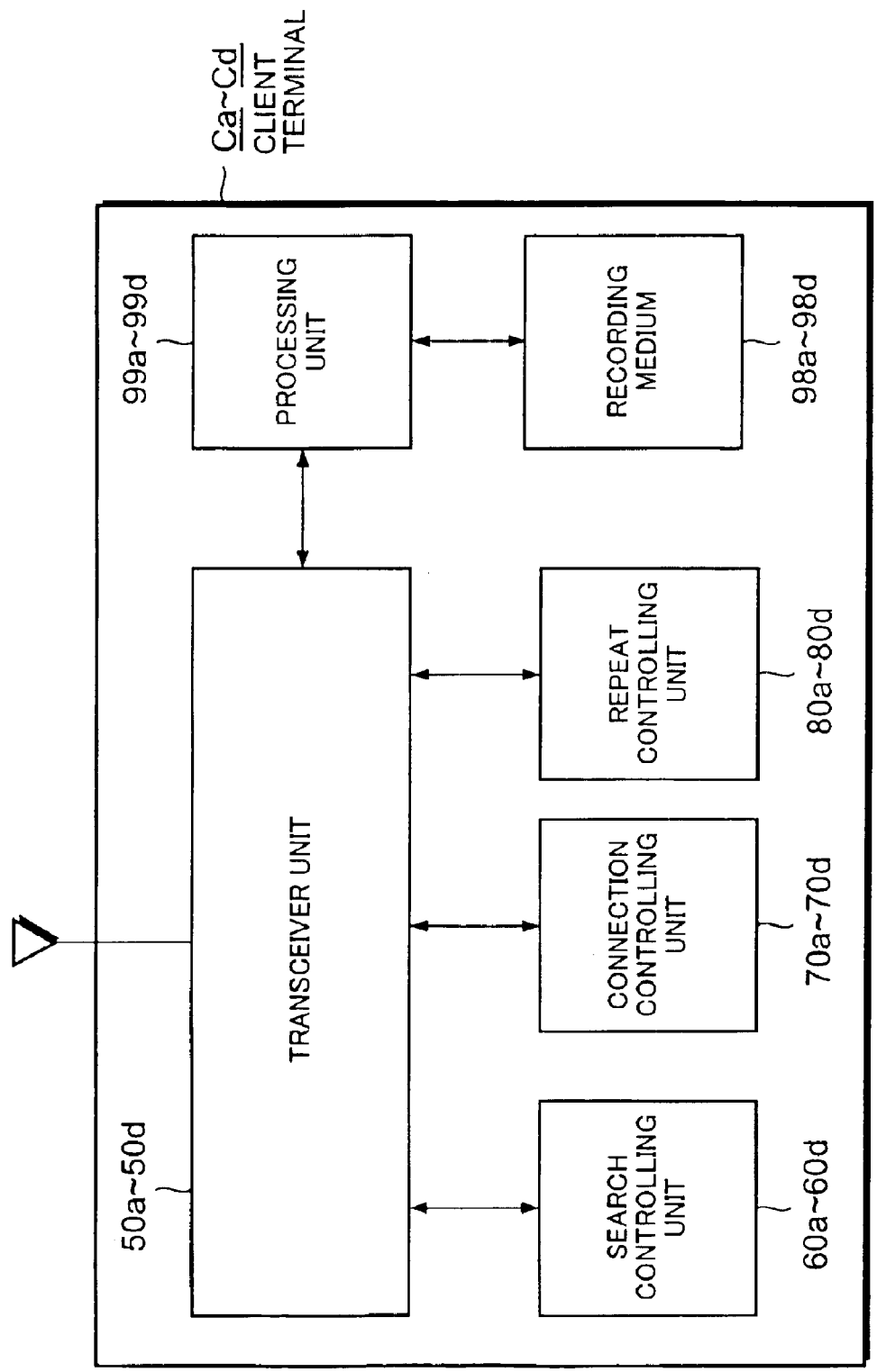
FIG. 3 is a block diagram of a client terminal of the wireless LAN system according to the FIG. 1 embodiment.

FIG. 3 is a block diagram of a client terminal of the wireless LAN system according to the FIG. 1 embodiment. The client terminal Ca shown in FIG. 3 consists of a transceiver unit 50a, a search controlling unit 60a, a connection controlling unit 70a, and a repeat controlling unit 80a.

The transceiver unit 50a communicates with the access points Pa and Pb (FIG. 1) by radio waves.

When communication is forced to terminate by the access point Pa or Pb, the search controlling unit 60a transmits a management frame through the transceiver unit 50a to search for another client terminal Cb–Cd to which the client terminal Ca will be connected.

The connection controlling unit 70a connects the client terminal Ca, through the transceiver unit 50a, to one of the client terminals Cb–Cd that was searched for by the search controlling unit 60a.

When a connection request is received from the connection controlling unit 70b–70d of one of the other client terminals Cb–Cd, the repeat controlling unit 80a instructs the transceiver unit 50a to perform communication processing for the MAC (Media Access Control) sub-layer and lower-level layers for data to be communicated between one of the client terminals Cb–Cd and the access point Pa or Pb (FIG. 1).

Transceiver units 50b–50d, search controlling units 60b–60d, connection controlling units 70b–70d, and repeat controlling units 80b–80d of the client terminals Cb–Cd each have the configuration similar to that of client terminal Ca.

The client terminals Ca–Cd may be, for example, standalone computers, POS (Point-Of-Sales) terminals, or portable information terminals with the radio communication function, or computers, POS terminals, or portable information terminals with no radio communication function but with a radio communication adapter connected.

Figure 4:
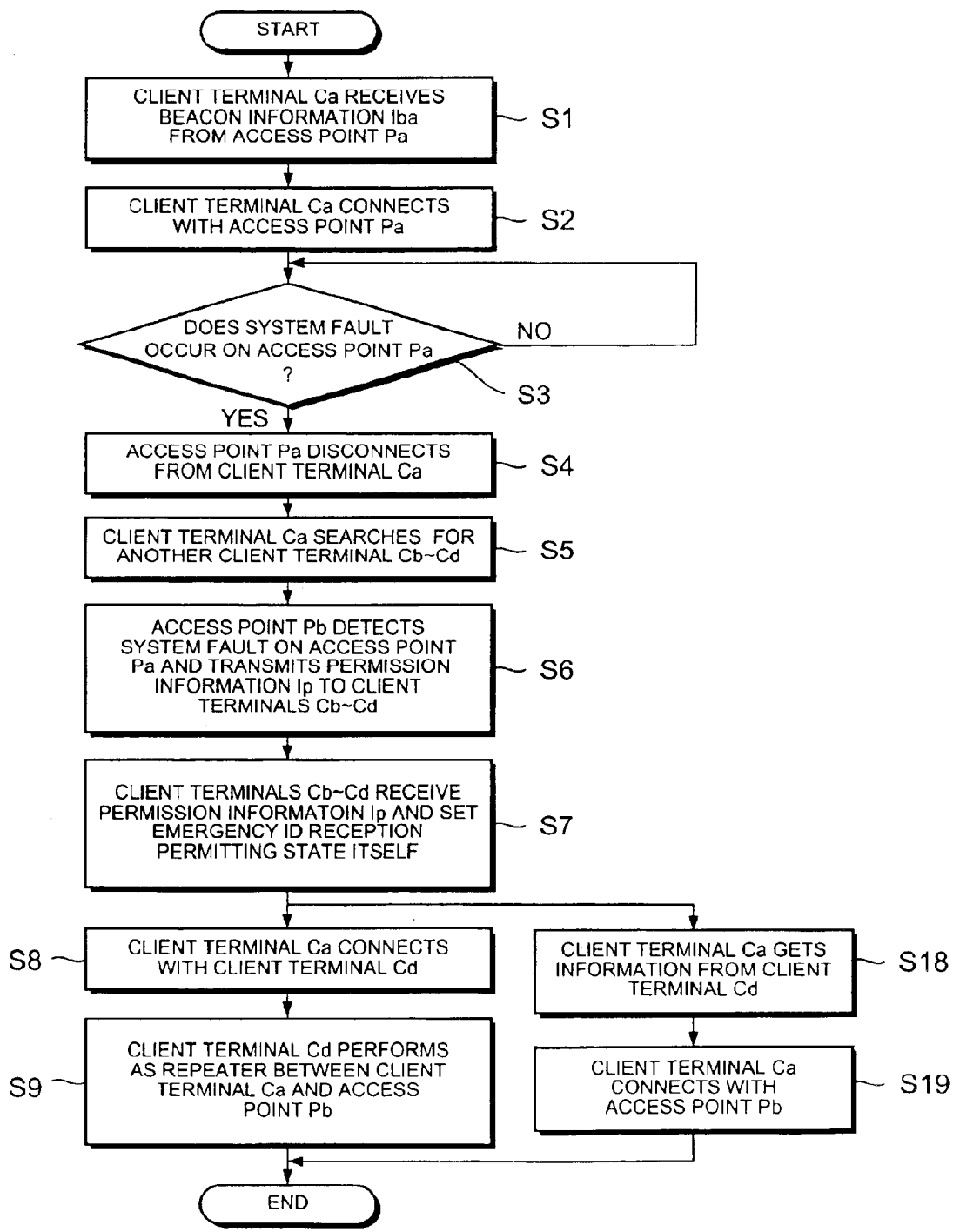
FIG. 4 is a flowchart showing a fault recovery processing of the wireless LAN system according to the FIG. 1 embodiment.

FIG. 4 is a flowchart showing a fault recovery processing of the wireless LAN system according to the FIG. 1 embodiment.

As shown in FIG. 1, the access points Pa and Pb transmit the beacon information Iba and Ibb at regular intervals, respectively (step S1 in FIG. 4).

Figure 5:
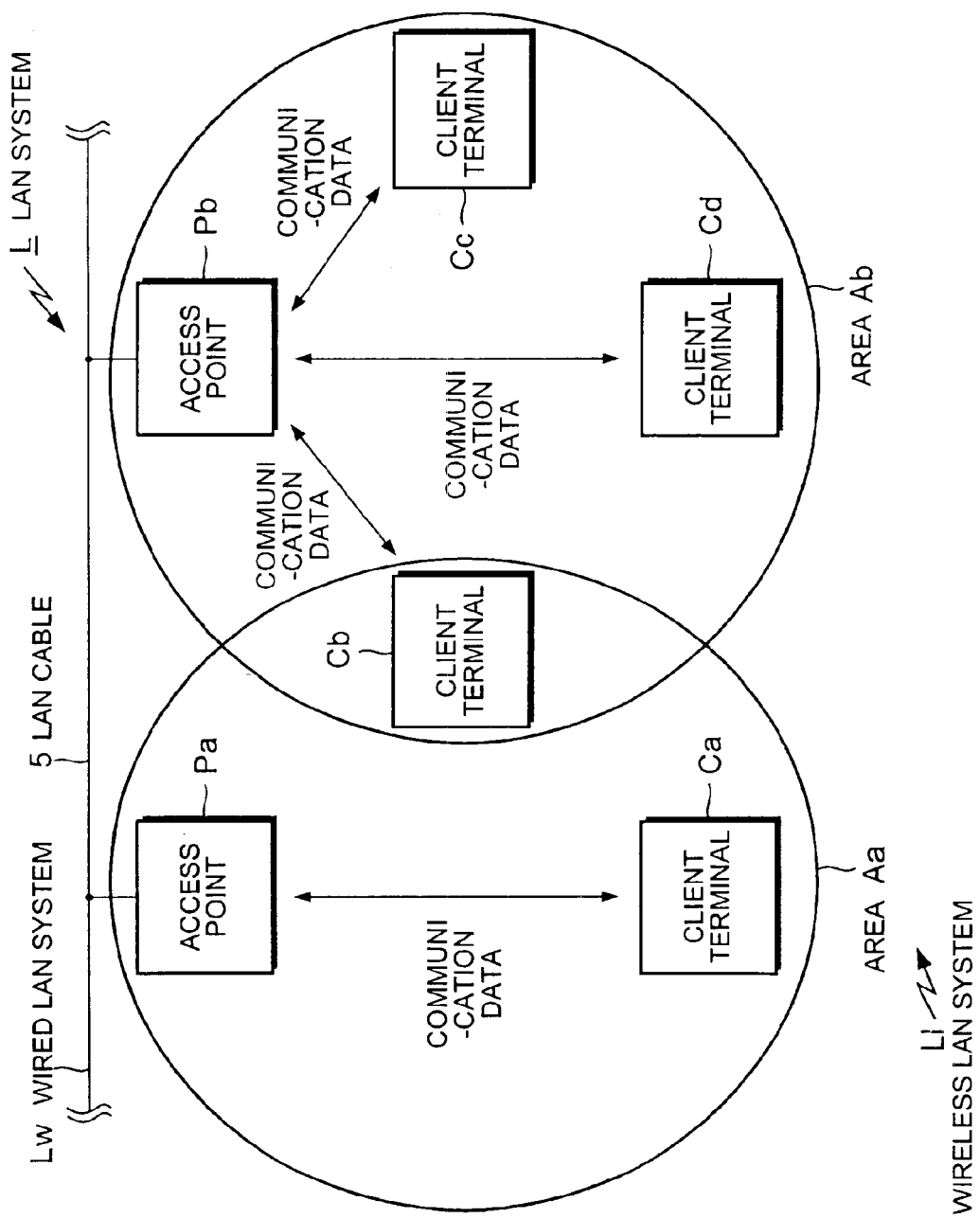
FIG. 5 is a diagram showing communication processing in the normal state of the wireless LAN system according to the FIG. 1 embodiment.

FIG. 5 is a diagram showing communication processing in the normal state of the wireless LAN system according to the FIG. 1 embodiment. Upon receiving the beacon information Iba from the access point Pa at power-on time or roaming time, the client terminal Ca transmits the management frame back to the access point Pa to perform negotiation therewith. The client terminal Ca then starts communication with the access point Pa as shown in FIG. 5 (step S2 in FIG. 4).

Each of the client terminals Cb–Cd performs negotiation with the access point Pb in the same way as described above and, as shown in FIG. 5, starts communication with the access point Pb.

Because this negotiation processing is a basic wireless LAN system technology that is well known, its description is omitted here.

Figure 6:
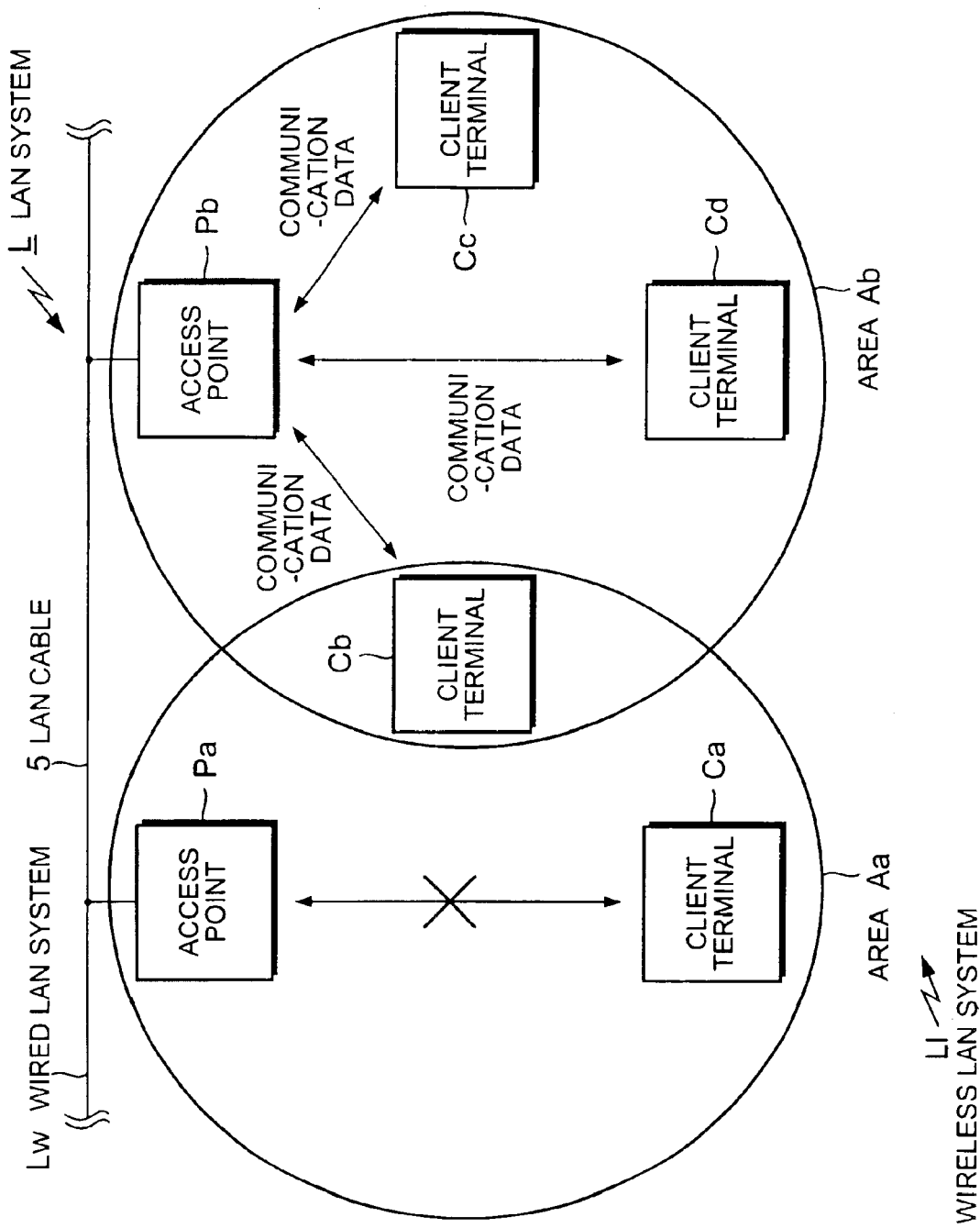
FIG. 6 is a diagram showing disconnection processing in the fault occurring state of the wireless LAN system according to the FIG. 1 embodiment.

FIG. 6 is a diagram showing disconnection processing in the fault occurring stage the wireless LAN system according to the FIG. 1 embodiment. Assume that, during normal communication processing shown in FIG. 5, a fault occurs on the access point Pa as shown in FIG. 6 (step S3 in FIG. 4). The cause of this fault is, for example, a fault in the main unit 1a (FIG. 2) of the access point Pa or the disconnection of the LAN cable 5 connected to the main unit 1a (FIG. 2).

The fault detecting unit 10a (FIG. 2) of the access point Pa monitors the status of communication between the wired LAN system Lw and the main unit 1a (FIG. 2). When the fault detecting unit 10a detects a fault on the main unit 1a of the access point Pa or on the LAN cable 5 connected therewith, the fault detecting unit 10a (FIG. 2) outputs the fault detection signal Sha (FIG. 2) to the disconnection controlling unit 20a (FIG. 2). In response to the fault detection signal Sha (FIG. 2), the disconnection controlling unit 20a (FIG. 2) disconnects the client terminal Ca, which is connected to the access point Pa at that time, from the access point Pa and forces communication between them to terminate (step S4 in FIG. 4).

Figure 7:
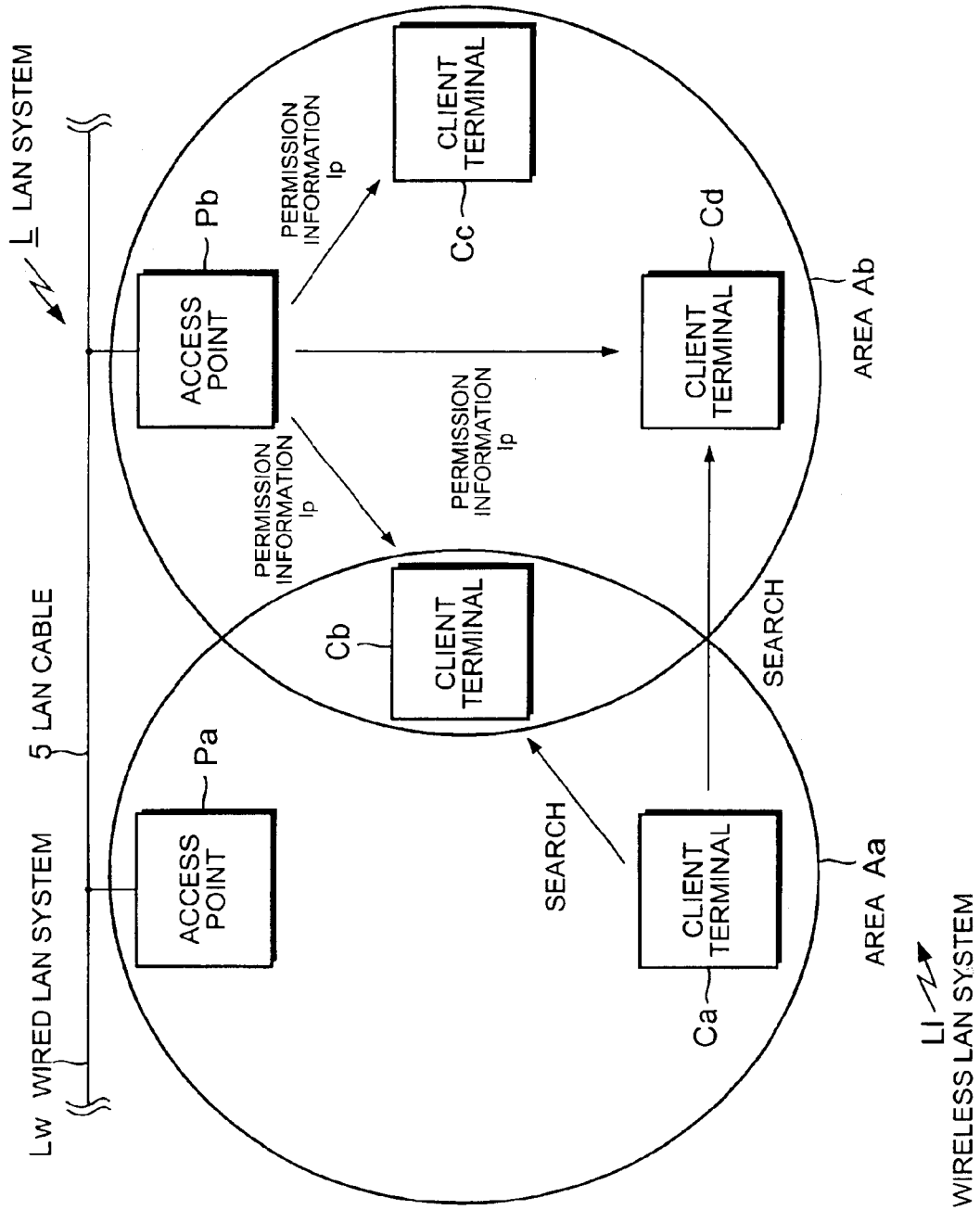
FIG. 7 is a diagram showing search processing in the fault occurring state the wireless LAN system according to the FIG. 1 embodiment.

FIG. 7 is a diagram showing search processing in the fault occurring state of the wireless LAN system according to the FIG. 1 embodiment. As shown in FIG. 7, the search controlling unit 60a (FIG. 3) of the disconnected client terminal Ca transmits a management frame, which is management information, through the transceiver unit 50a (FIG. 3) to search for another client terminal Cb–Cd to which the client terminal Ca is to be connected (step S5 in FIG. 4).

On the other hand, the fault detecting unit 30b (FIG. 2) of the other access point Pb detects the occurrence of the fault in the access point Pa based on the beacon information Iba, starts the operation of the permission information generating unit 40b (FIG. 2). The fault detecting unit 30b (FIG. 2) transmits the permission information Ip to the client terminals Cb–Cd through the main unit 1b (FIG. 2) (step S6 in FIG. 4).

Upon receiving the permission information Ip, the transceiver units 50b–50d (FIG. 3) of the client terminals Cb–Cd in the area Ab under control of the access point Pb are set to the emergency ID reception permitting state (step S7 in FIG. 4).

Figure 8:
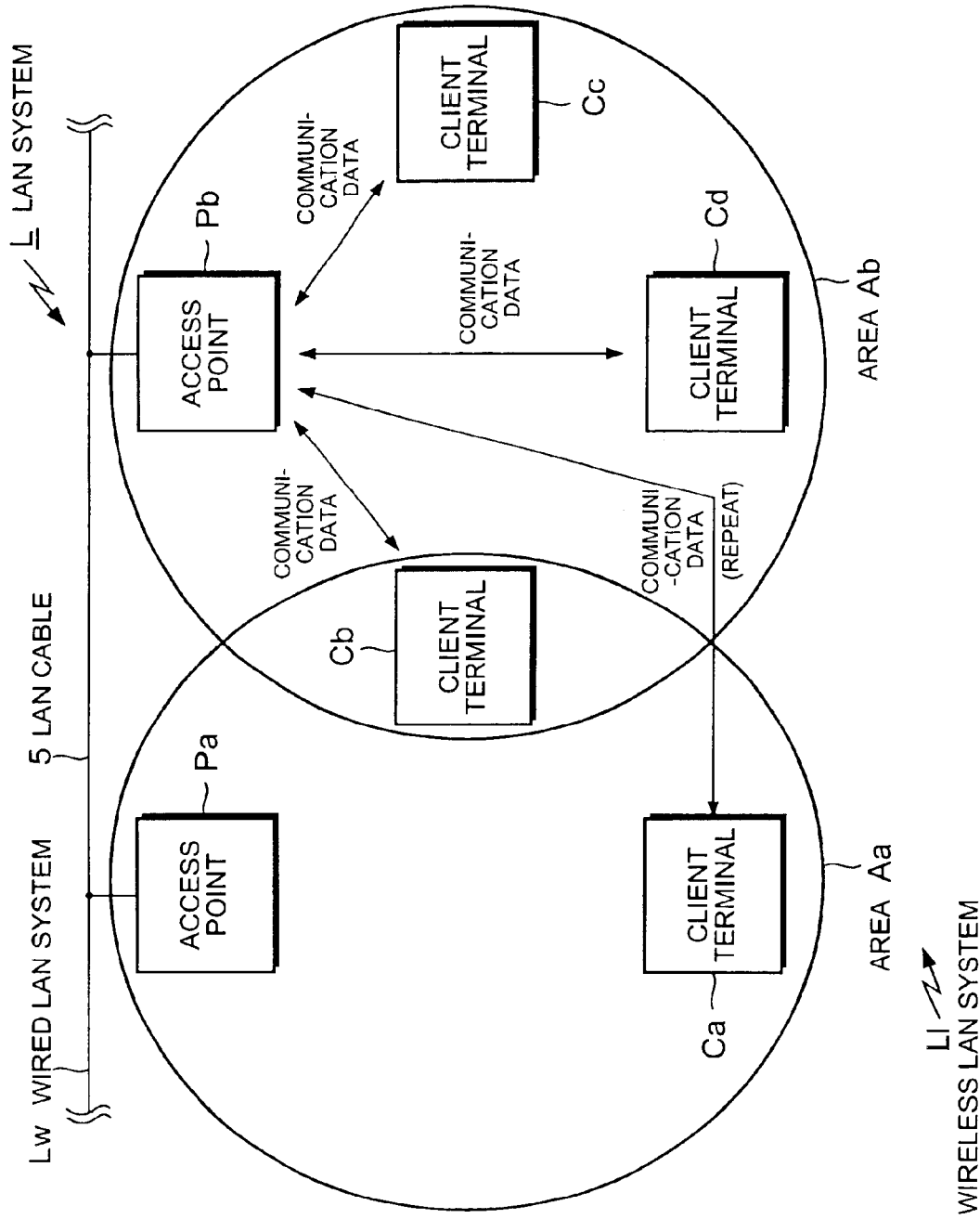
FIG. 8 is a diagram showing connection processing in the fault occurring state of the wireless LAN system according to the FIG. 1 embodiment.

FIG. 8 is a diagram showing connection processing in the fault occurring state of the wireless LAN system according to the FIG. 1 embodiment. The connection controlling unit 70a (FIG. 3) of the disconnected client terminal Ca transmits the emergency ID code to the client terminal Cd through the transceiver unit 50a (FIG. 3). The connection controlling unit 70a (FIG. 3) then performs connection processing such as log-in processing for the client terminal Cd that was searched for during the search processing (step S8 in FIG. 4).

The client terminal Cd controls communication between the client terminal Cd itself and the access point Pb and, at the same time, relays data to be communicated between the client terminal Ca and the access point Pb (step S9 in FIG. 4).

In this way, the client terminal Cd performs as a repeater that relays communication data of the client terminal Ca that is a disconnected client terminal. In this embodiment, the equal distribution system is used and all client terminals Ca–Cd operate under the same logic. Therefore, all client terminals Ca–Cd are eligible for a repeater.

Thus, at emergency time, even if the ID code of the client terminal Ca is different from the ID code of the Client terminal Cd, the emergency ID code is used for all the client terminals Ca–Cd commonly. This allows the client terminal Ca to connect to one of the client terminals Cb–Cd.

The fault recovery processing for the whole LAN system L is completed by executing the above steps.

Figure 9:
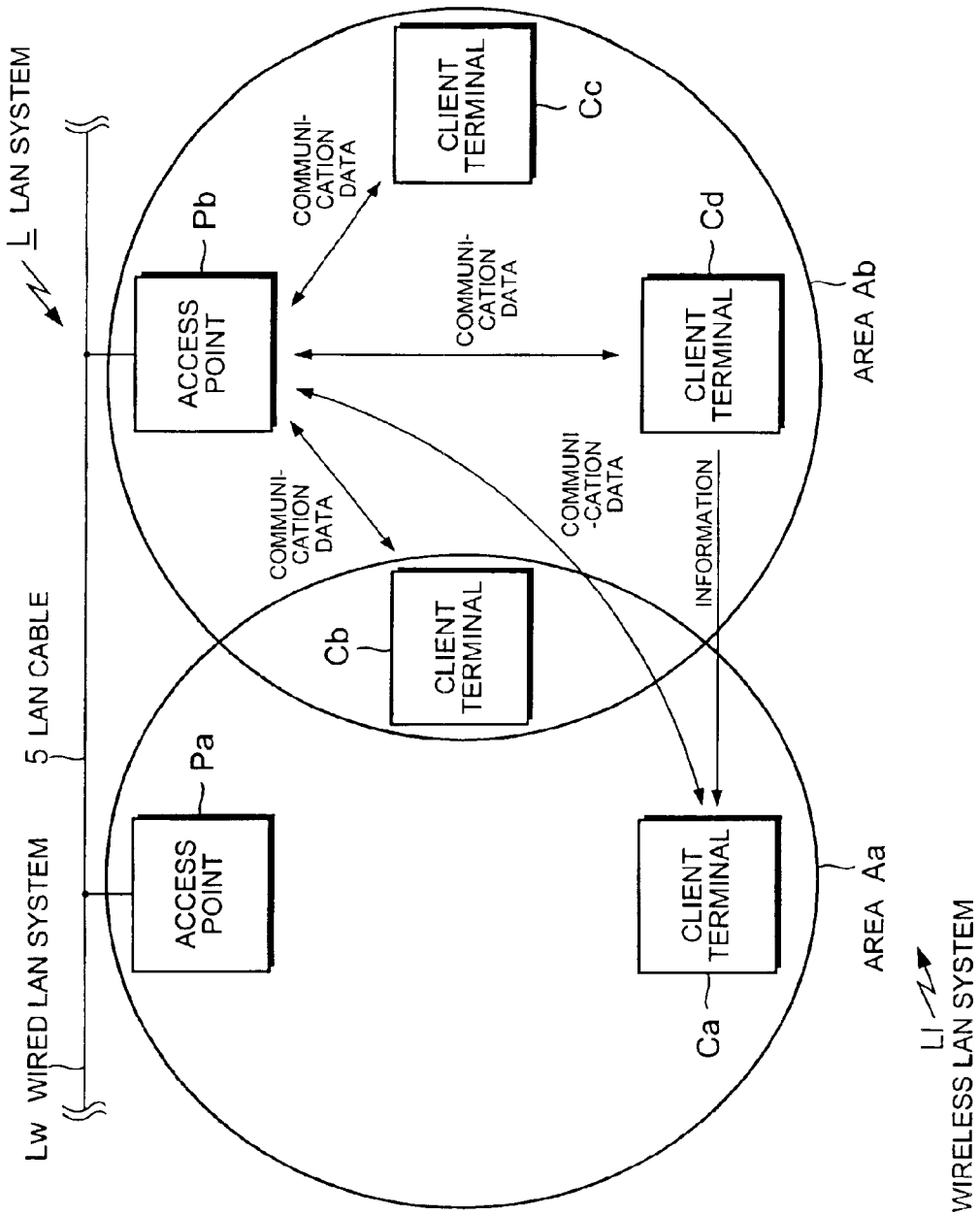
FIG. 9 is a diagram showing another connection processing in the fault occurring state of the wireless LAN system according to the FIG. 1 embodiment.
Figure 10:
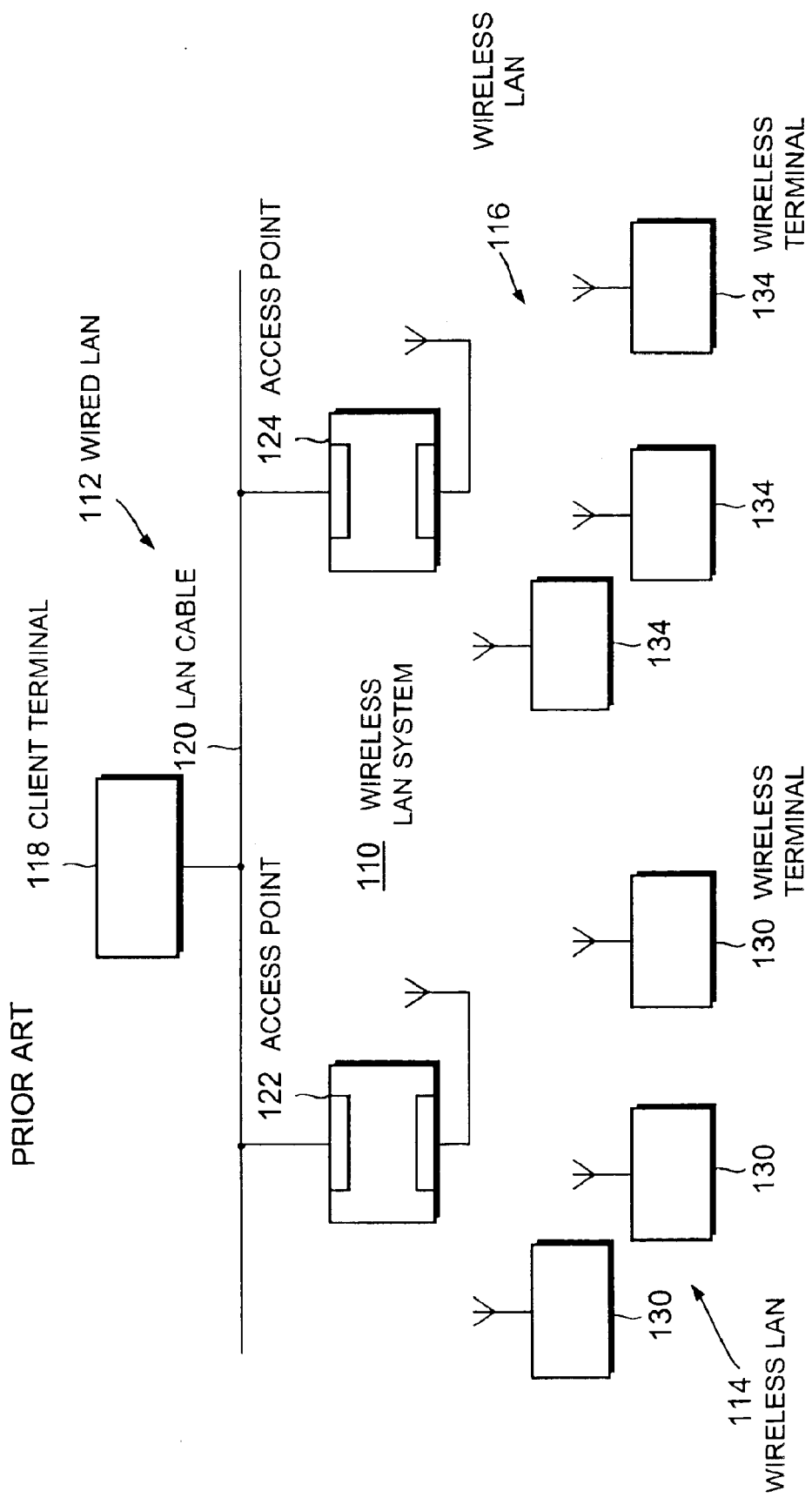
FIG. 10 is a block diagram of the wireless LAN system according to the first conventional example.
Figure 11:
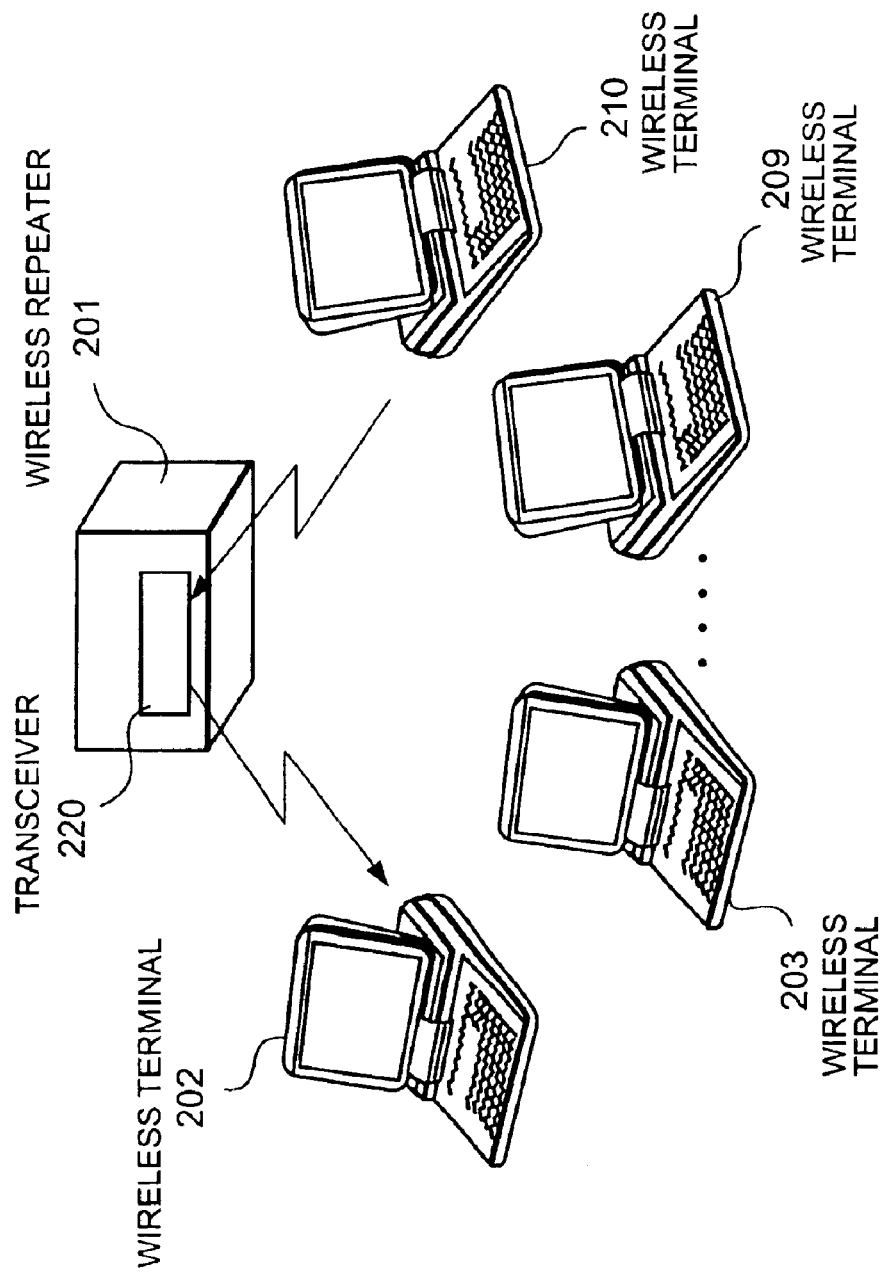
FIG. 11 is a block diagram of the wireless LAN system according to the second conventional example.
Figure 12:
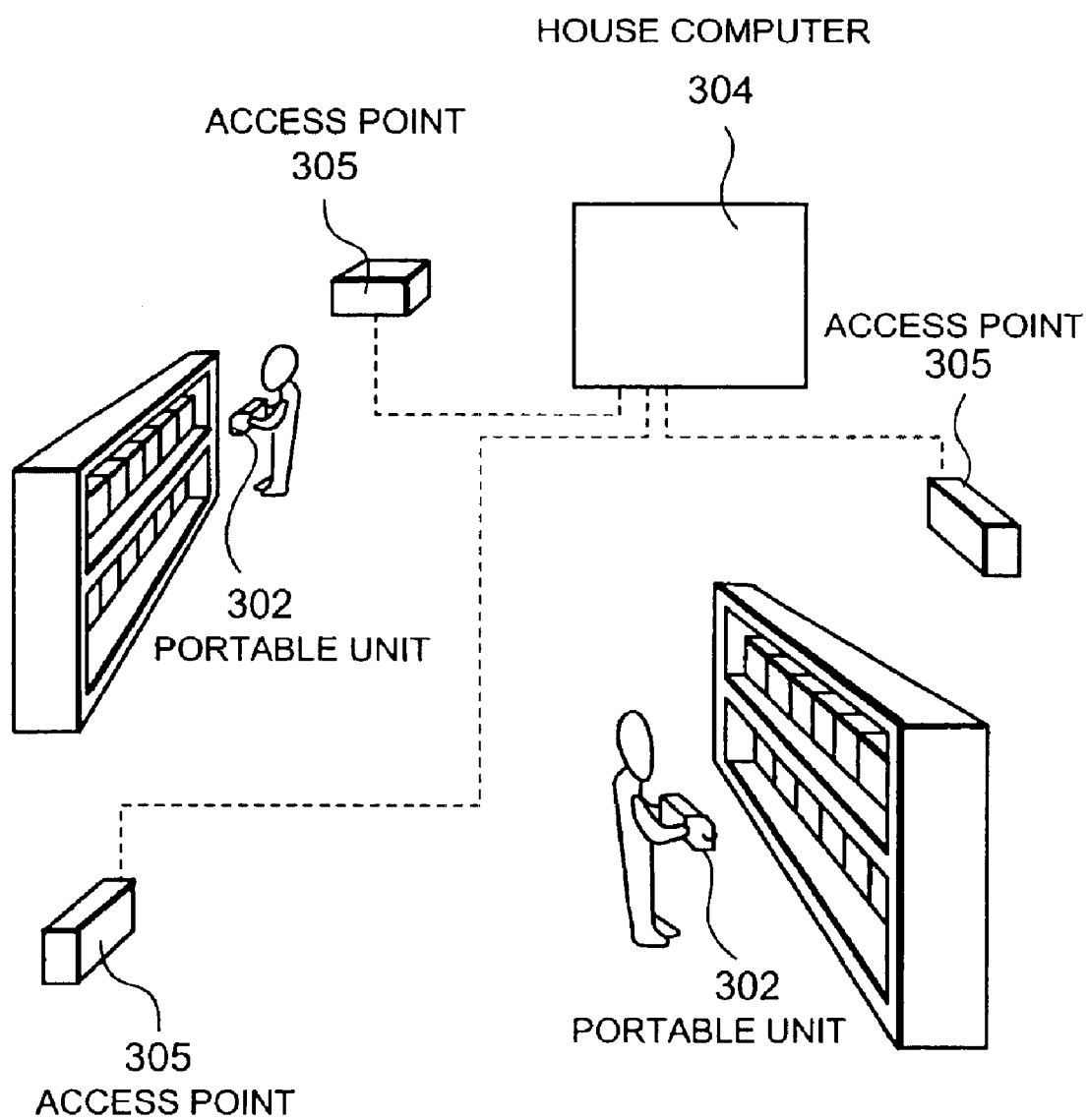
FIG. 12 is a block diagram of the wireless LAN system according to the third conventional example.
Figure 13:
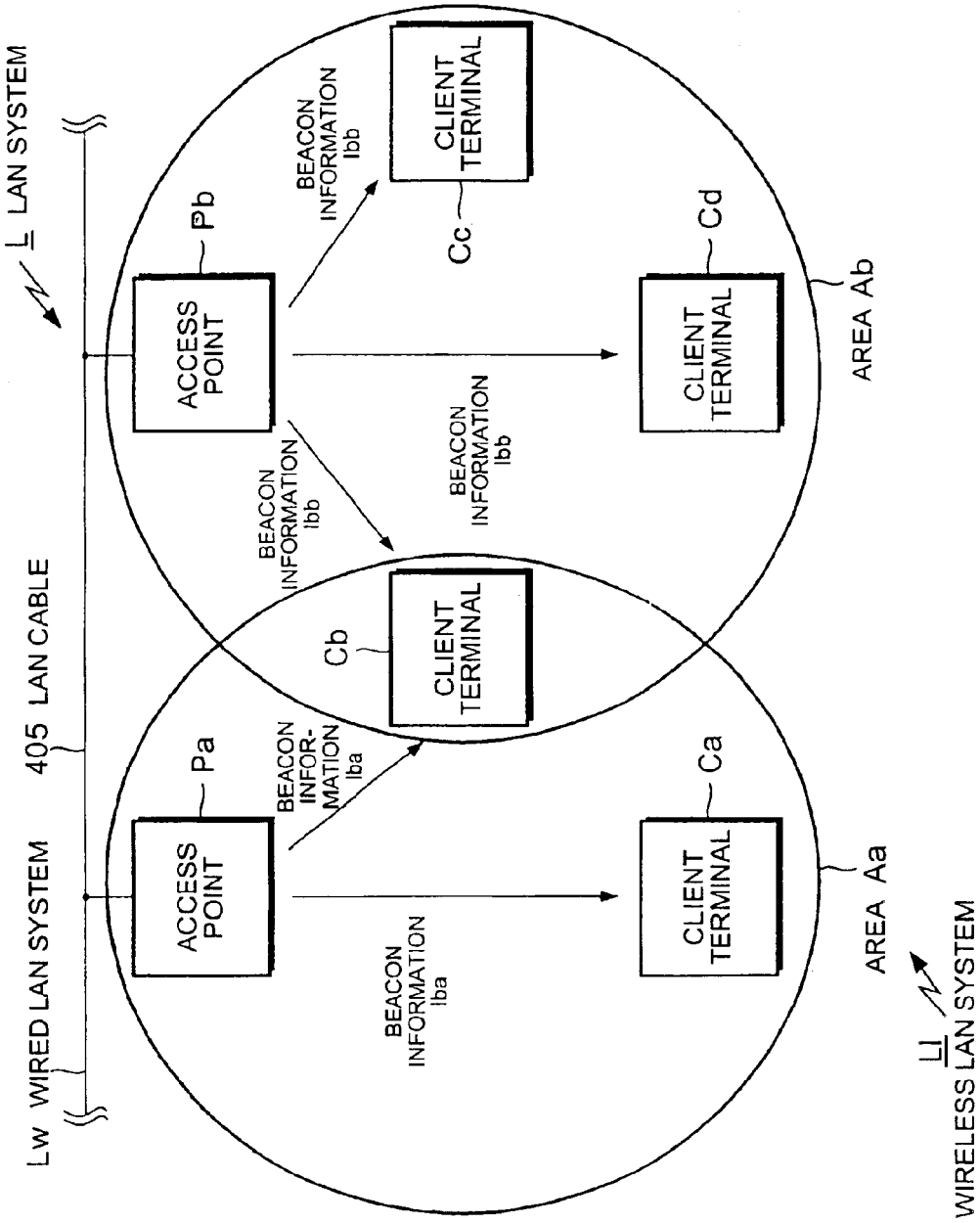
FIG. 13 is a block diagram of the wireless LAN system according to the fourth conventional example.

FIG. 9 is a diagram showing another connection processing in the fault occurring state of the wireless LAN system according to the FIG. 1 embodiment. Instead of the processing shown in FIG. 8 in which the client terminal Ca connects to the access point Pb through the repeat controlling unit 80a of the client terminal Cd (steps S8 and S9 in FIG. 4), the client terminal Ca obtains communication information from the client terminal Cd. This communication information includes information on the access point Pb to which the client terminal Ca can access. Then, the search controlling unit 60a and the connection controlling unit 70a of the client terminal Ca negotiate directly with the access point Pb to connect the client terminal Ca thereto (steps S18 and S19 in FIG. 4).

This method prevents the communication load from being concentrated at the client terminal Cd, thus minimizing a decrease in the throughput of the wireless LAN system Ll.

In the above embodiments, each of the access points Pa and Pb consists of the main unit 1a or 1b, fault detecting unit 10a or 10b, disconnection controlling unit 20a or 20b, fault detecting unit 30a or 30b, and permission information generating unit 40a or 40b, respectively. Instead of this configuration, the units except the main unit 1a and 1b may be implemented by a software program built in the access points Pa and Pb. As shown in FIG. 2, this software program is stored on a recording medium 96a or 96b, such as a memory contained in the access point Pa or access point Pb. Processing means 97a or 97b, such as the CPU (Central Processing Unit), is provided to read this program for execution.

On the other hand, each of the client terminals Ca–Cd consists of each of the transceiver units 50a–50d, each of the search controlling units 60a–60d, each of the connection controlling unit s70a–70d, and each of the repeat controlling units 80a–80d, respectively. These units except the transceiver units 50a–50d may be implemented by a software program built in each of the client terminals Ca–Cd. As shown in FIG. 3, this software program may be stored on each recording medium 98a–98d such as a memory contained in each client terminal Ca–Cd. Each processing means 99a–99d, such as the CPU, is provided to read this program for execution.

Even when a fault occurs in an access point, the system according to the present invention eliminates the need for a client terminal connected to that access point to wait until another access point transmits beacon information. Instead, the client terminal automatically searches for another nearby client terminal and causes the nearby client terminal to perform as a repeater. This allows management information required for communication control to be obtained easily and quickly. As a result, communication among client terminals may be reestablished more quickly than in the conventional examples described above.

In addition, the system according to the present invention prevents a plurality of client terminals with no connection destination from attempting to connect to the same access point at the same time. This access-point load balancing ability prevents the throughput of the whole LAN system from being decreased.

What is claimed is:

1. A wireless local area network system comprising a plurality of access points and a plurality of client terminals;

wherein each of said plurality of access points comprises:

a main unit for communicating with said client terminals, a first fault detecting unit for detecting a fault on said main unit, and a disconnection controlling unit for disconnecting said client terminal connected to said access point where said fault was detected by said first fault detecting unit; and wherein each of said plurality of client terminals comprises:

a transceiver unit for communicating with said access point, a search controlling unit for searching for another client terminal to which said client terminal disconnected from said access point is to be connected, and a connection controlling unit for connecting said disconnected client terminal to said searched client terminal by said search controlling unit independent of the plurality of access points, wherein said connection controlling unit, instead of connecting said disconnected client terminal to said searched client terminal, for obtaining communication information from said searched client terminal by said search controlling unit and communicating with another of said access points connected to said searched client terminal.

2. A wireless local area network system comprising a plurality of access points and a plurality of client terminals; wherein each of said plurality of access points comprises:

a main unit for communicating with said client terminals, a first fault detecting unit for detecting a fault on said main unit, and a disconnection controlling unit for disconnecting said client terminal connected to said access point where said fault was detected by said first fault detecting unit; and wherein each of said plurality of client terminals comprises:

a transceiver unit for communicating with said access point, a search controlling unit for searching for another client terminal to which said client terminal disconnected ftom said access point is to be connected, and a connection controlling unit for connecting said disconnected client terminal to said searched client terminal by said search controlling unit independent of the plurality of access points, wherein each of said access points further comprising:

a second fault detecting unit for detecting a fault on the other of said access points, and a permission information generating unit for transmitting permission information permitting said client terminals connected to said access point to accept an emergency identification code, said permission information being transmitted when said second fault detecting unit detects said fault.

3. The wireless local area network system as defined in claim 2, wherein said connection controlling unit of said disconnected client terminal connects, by using the emergency identification code, said disconnected client terminal to said searched client terminal which has received said permission information.

4. A fault recovery method for use in a wireless local area network system comprising a plurality of access points and a plurality of client terminals, the method comprising the steps of:

detecting, by each of said access points, whether a fault occurs on each of said access points itself;

disconnecting, by said access point which has detected said fault, said client terminal connected thereto;

searching for, by said disconnected client terminal, another of said client terminals to which said disconnected client terminal is to be connected; and connecting said disconnected client terminal to said searched client terminal independent of the plurality of access points, comprising, instead of said connecting step, the steps of:

obtaining, by said disconnected client terminal, communication information from said searched client terminal; and communicating said disconnected client terminal with one of said access point connected to said searched client terminal.

5. A fault recovery method for use in a wireless local area network system comprising a plurality of access points and a plurality of client terminals, the method comprising the steps of:

detecting, by each of said access points, whether a fault occurs on each of said access points itself;

disconnecting, by said access point which has detected said fault, said client terminal connected thereto;

searching for, by said disconnected client terminal, another of said client terminals to which said disconnected client terminal is to be connected; and connecting said disconnected client terminal to said searched client terminal independent of the plurality of access points, further comprising the step of, when said access point detects a fault on the other of said access points, transmitting, by said access point, permission information for permitting said client terminals connected to said access point to accept an emergency identification code.

6. The fault recovery method for use in a wireless local area network system as defined in claim 5, further comprising the step of connecting, by using said emergency identification code, said disconnected client terminal to said searched client terminal which has received said permission information.

7. A computer readable medium storing therein a computer program for executing a fault recovery process for use in a wireless local area network system comprising a plurality of access points and a plurality of client terminals, the process comprising the steps of:

detecting, by each of said access points, whether a fault occurs on each of said access points itself;

disconnecting, by said access point which has detected said fault, said client terminal connected thereto;

searching for, by said disconnected client terminal, another of said client terminals to which said disconnected client terminal is to be connected; and connecting said disconnected client terminal to said searched client terminal independent of the plurality of access points, comprising, instead of said connecting step, the steps of:

obtaining, by said disconnected client terminal, communication information from said searched client terminal; and communicating said disconnected client terminal with one of said access point connected to said searched client terminal.

8. A computer readable medium storing therein a computer program for executing a fault recovery process for use in a wireless local area network system comprising a plurality of access points and a plurality of client terminals, the process comprising the steps of:

detecting, by each of said access points, whether a fault occurs on each of said access points itself;

disconnecting, by said access point which has detected said fault, said client terminal connected thereto;

searching for, by said disconnected client terminal, another of said client terminals to which said disconnected client terminal is to be connected; and connecting said disconnected client terminal to said searched client terminal independent of the plurality of access points, further comprising the step of, when said access point detects a fault on the other of said access points, transmitting, by said access point, permission information for permitting said client terminals connected to said access point to accept an emergency identification code.

9. The computer readable medium storing therein a computer program for executing the fault recovery process for use in a wireless local area network system as defined in claim 8, further comprising the step of connecting, by using said emergency identification code, said disconnected client terminal to said searched client terminal which has received said permission information.

* * * * *